United States Patent

[11] 3,540,362

| [72] | Inventor | Frederick W. Macone |
| | | Carlisle, Massachusetts |
| [21] | Appl. No. | 714,940 |
| [22] | Filed | March 21, 1968 |
| [45] | Patented | Nov. 17, 1970 |
| [73] | Assignee | Avant Incorporated |
| | | Lincoln, Massachusetts |
| | | a corporation of Massachusetts |

[54] CAMERA MASKING DEVICE PARTICULARLY USEFUL IN IDENTIFICATION CARD CAMERAS
12 Claims, 5 Drawing Figs.

[52] U.S. Cl. .................................................. 95/36, 95/18
[51] Int. Cl. ........................................... G03b 19/02
[50] Field of Search ................................... 95/1.1, 36, 18 Consulted

[56] References Cited
UNITED STATES PATENTS

| 347,451 | 8/1886 | Varing | 95/36 |
| 2,545,899 | 3/1951 | Soba | 95/36X |
| 3,323,432 | 6/1967 | Rabanit | 95/18 |
| 3,433,563 | 3/1969 | Beckerman | 95/36X |
| 3,443,499 | 5/1969 | Gianino | 95/36X |
| 3,490,844 | 1/1970 | Sapp | 95/1.1X |

Primary Examiner—John M. Horan
Assistant Examiner—Robert P. Greiner
Attorney—Robert L. Nathans ABSTRACT: A camera masking device which includes a movable masking member which is translated in space in a positive and reliable manner to selectively cover one or the other of two pair of light transmission openings or to assume a position intermediate the two light transmission openings. The movable masking member is in the form of a flat plate having a rectangular portion and a triangular portion. The masking member is driven through various positions and is guided by a cavity which also has a rectangular portion and a triangular portion. This configuration results in a compact masking device which produces strictly translational displacement of the masking member in response to rotary input motion.

Patented Nov. 17, 1970

3,540,362

FREDERICK W. MACONE
INVENTOR.

BY Robert L Mathans

ATTORNEY.

CAMERA MASKING DEVICE PARTICULARLY USEFUL IN IDENTIFICATION CARD CAMERAS

BACKGROUND OF THE INVENTION

Figure 5:
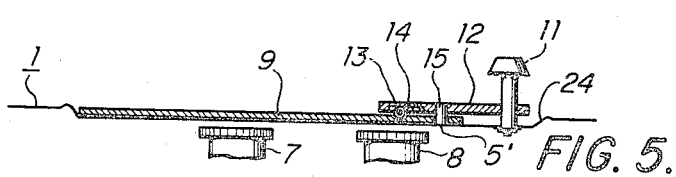

Prior art masking devices may utilize masks which are translationally shifted from one position to another to assume desired masking positions. These masks require an elongated drive plunger which is clumsy and occupies considerable space. See Column 6 and FIG. 7 of U.S. Pat. 3,345,924. Longitudinal bearings or guide rails, which require lubrication, are generally employed in conjunction with this type of translational mask. In FIG. 5 of this patent a device utilizing angular rotation is employed which is relatively clumsy, lacks compactness, and does not provide strictly translational positioning of the mask. The masking device of the present invention employs a unique mechanical construction which results in a compact, reliable masking device wherein an elongated movable mask is translated from one position to another by merely turning a knob to one of three required positions. The movable masking member coacts with various components of the device in a manner to produce reaction forces on the knob when the mask assumes any of the terminal positions so that the operator can feel the seating of the movable masking member to give him a positive indication that the mask has been properly positioned. The aforesaid elongated bearings or guide members are thus eliminated along with the need to lubricate them.

SUMMARY OF AN EMBODIMENT OF THE INVENTION

In accordance with an embodiment of the invention, an elongated movable masking member having a given longitudinal axis is selectively actuated between three terminal positions by a rotary actuating member. During actuation, the movable masking member mechanically reacts with the walls of a plate upon which the masking member rests so that the longitudinal axis of the masking member in any one terminal position is parallel with the axis when the masking member assumes any other terminal position. In the upper and lower terminal positions the movable masking member is pushed up against the wall portions so that the operator can positively feel the seating of the masking member through the rotary actuating member.

Figure 3:
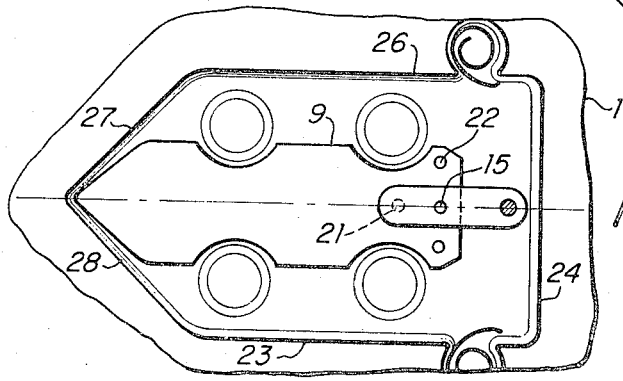

Other objects, features and advantages of the present invention will become apparent upon examination of the following description taken in conjunction with the drawing in which:

FIGS. 1—4 illustrate front views of the masking device as the movable masking member assumes various positions and;

FIG. 5 illustrates a side view of FIG. 3.

Figure 1:
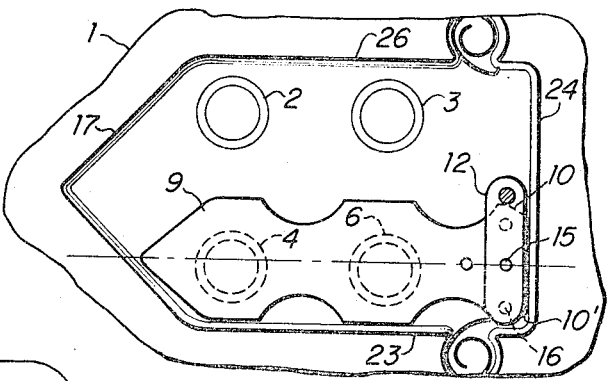

In FIG. 1, plate 1 is provided having apertures 2, 3, 4 and 6 formed therein which allow light to pass therethrough to associated lens elements, such as 7 and 8 shown in FIG. 5, when they are not covered by movable masking member or blade 9. In FIG. 1, masking member 9 is shown in the first or lower terminal position to cover the first light transmission means consisting of apertures 4 and 6 formed in plate 1.

Figure 2:
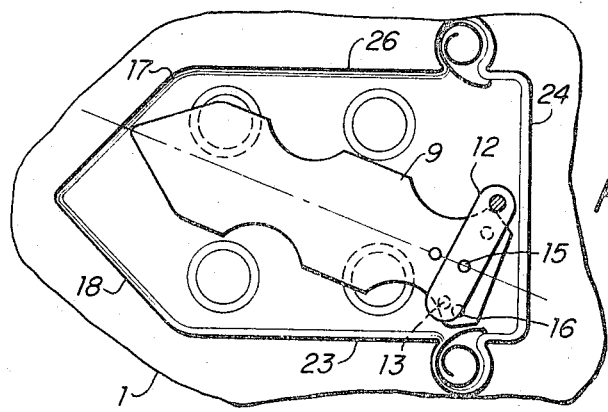
Figure 4:
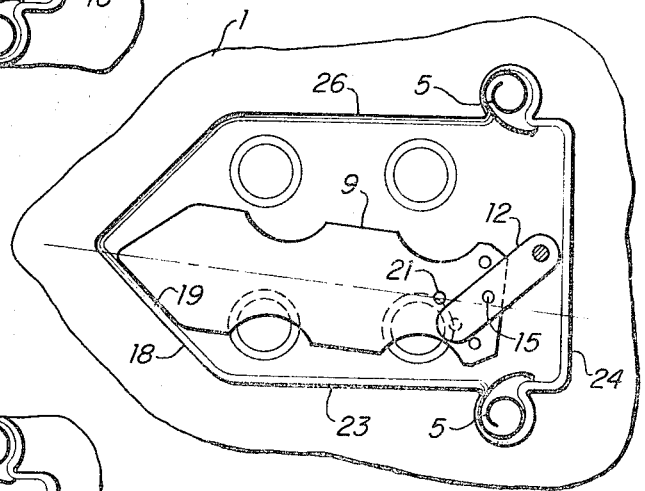

When knob 11 is turned clockwise rotary link 12 commences to rotate. Since link mounted ball 13 is biased against blade 9 by spring 14, mounted within link 12, and since the ball is seated within hole 16 formed within blade 9, the blade is driven until its tip touches wall portion 17. The blade is also driven by pin 15 which extends from the link and is at all times seated within hole 5' formed within the blade. Further rotation causes the ball to move out of hole 16 and over the top of blade 9 due to the reaction force applied by wall portion 17. FIG. 2 illustrates the elements upon approximate 30° rotation of the pivotable link member. Further clockwise rotation causes blade 9 to move down along wall portion 17. The slightly rounded nose of blade 9 continues moving down wall portion 17 and ball 13 drops into hole 21 formed in blade 9 and the elements assume the second terminal position shown in FIG. 3. Further clockwise rotation of the link will cause the ball to move out of hole 21 and drive blade 9 in a manner similar to that already described until the ball falls into hole 22 as the nose of the blade rides up wall portion 27 and the blade approaches the third terminal position. The blade will now be positively driven until the upper right hand corner of the blade is positioned flush against wall portions 24 and 26. Within the third terminal position blade 9 will occupy the upper portion of the plate cavity just as blade 9 occupied the lower portion of the plate cavity as shown in FIG. 1. The operator can feel the reaction forces applied by the three right-hand wall portions 23, 24 and 26 within the first and third terminal positions. In the second terminal position shown in FIG. 3, the operator also feels the seating action of the blade due to the action of the ball 13 dropping into hole 21. FIG. 4 illustrates the blade position as the pivotable link is being rotated counterclockwise halfway between the second terminal position and the lower terminal position. Flat coil springs 5 may be provided, especially where the masking device is vertically oriented, to secure the blade in the upper terminal position against the force of gravity. The springs may be seated within circular cavities formed within the plate and provide locking and detent action as they are slightly deformed by the bevelled corners 10 and 10' of the blade.

Having thus described a single embodiment of the invention, it is obvious that the same is not to be restricted thereto, but is broad enough to cover all structures coming within the scope of the annexed claims. For example, the term "wall portion" may include any stop member which abuts against the movable masking member. The plate need not have a walled cavity formed therein although this structure is preferred. A flat plate having discrete or continuous stops affixed thereto could be employed in the alternative. The device is often oriented vertically for certain composite picture applications (rather than horizontally as indicated in the drawings), as discussed in the aforesaid patent.

I claim:

1. A camera masking device especially useful in an identification camera comprising:
   a. a plate having a first and second light transmission means associated therewith;
   b. a first pair of substantially parallel wall portions associated with said plate;
   c. a second pair of wall portions associated with said plate forming an acute angle with one another;
   d. a movable masking member having a first pair of elongated sides parallel with one another and a second pair of sides forming an acute angle with one another; and
   e. actuating means for converting angular displacement applied as a mechanical input thereto into translational displacement of said mask and for selectively positioning one side of said first pair of elongated sides of said masking member against one wall portion of said first pair of substantially parallel wall portions associated with said plate to cover said first light transmission means with said masking member or for selectively positioning the other side of said first pair of elongated sides of said masking member against the other wall portion of said first pair of substantially parallel wall portions associated with said plate to cover said second light transmission means with said masking member or for selectively positioning said masking member intermediate said first and second light transmission means.

2. The combination as set forth in claim 1 wherein said masking member is positioned with respect to said wall portions to cause the second pair of sides of said masking member to push against said second pair of wall portions as said actuating means causes said masking member to pass from one position to another to maintain the parallel sides of said masking member substantially parallel with said first pair of wall portions when said masking member is in each of the three aforesaid positions.

3. The combination as set forth in claim 2 wherein said actuating means comprises a pivoted link for driving said masking member from one position to another and for translating rotary displacement of said link into translational displacement of said masking member from one position to another.

4. The combination as set forth in claim 3 wherein detent means are provided intermediate said pivotable link and said masking member.

5. The combination as set forth in claim 4 wherein said detent means includes a spring biased contact member mounted upon said pivotable link and three indentations formed within said masking member.

6. The combination as set forth in claim 5 wherein said spring biased contact member includes a ball, spring biased against said masking member, said ball being seated within said indentations when said masking member assumes said positions and which rides over said masking member when said masking member is driven between said positions.

7. The combination as set forth in claim 2 wherein the acute angle between said second pair of wall portions is greater than the acute angle between the second pair of sides of said elongated masking member.

8. The combination as set forth in claim 7 wherein the junction between the second pair of sides of said masking member is rounded to facilitate the transition between said positions.

9. The combination as set forth in claim 2 wherein said elongated masking member has cutouts formed therein to prevent said light transmission means from being covered by said elongated masking member when said masking member is intermediate said first and second light transmission means.

10. A camera masking device especially useful in an identification camera comprising:
  a. a first light transmission means;
  b. a second light transmission means separate from said first light transmission means;
  c. a movable mask having a flat surface associated therewith and a center line lying in the plane of said flat surface for selectively covering said first light transmission means in a first position or said second light transmission means in a second position or none of said light transmission means in a third position; and
  d. mask actuating means for converting angular displacement applied as a mechanical input thereto into translational displacement of said mask for causing said mask to selectively assume said first, second or third positions without angular deviation of said center line of said mask when the position of said center line in any one of said first, second or third positions is compared with the position of said center line in any other of said first, second or third positions to produce strictly translational shifts in position of said masking member.

11. The combination as set forth in claim 10 wherein the angular displacement of said mask actuating means to position said movable mask in all of said positions is less than 360°.

12. The combination as set forth in claim 10 wherein the angular displacement of said mask actuating means to position said movable mask from one position to another is about 90°.